(12) United States Patent
Mackey (10) Patent No.: US 11,009,349 B2
(45) Date of Patent: May 18, 2021

(54) LEVEL WITH REMOVABLE AND/OR INTERCHANGEABLE SLEEVE

(71) Applicant: Milwaukee Electric Tool Corporation, Brookfield, WI (US)

(72) Inventor: Eric S. Mackey, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/796,573

(22) Filed: Feb. 20, 2020

(65) Prior Publication Data

US 2020/0191567 A1 Jun. 18, 2020

Related U.S. Application Data

(63) Continuation of application No. 15/725,034, filed on Oct. 4, 2017, now Pat. No. 10,591,297.

(60) Provisional application No. 62/404,630, filed on Oct. 5, 2016.

(51) Int. Cl.
*G01C 9/26* (2006.01)
*G01C 9/34* (2006.01)

(52) U.S. Cl.
CPC ........... *G01C 9/26* (2013.01); *G01C 9/34* (2013.01)

(58) Field of Classification Search
CPC .................................. G01C 9/26; G01C 9/34
USPC ............................................................ 33/301
See application file for complete search history.

(56) References Cited

U.S. PATENT DOCUMENTS

| | | |
|---|---|---|
| 3,889,353 A | 6/1975 | Provi |
| 3,921,306 A | 11/1975 | Provi |
| 4,130,943 A | 12/1978 | Talbot |
| 4,407,075 A | 10/1983 | MacDermott et al. |
| 4,928,395 A | 5/1990 | Good |
| 5,249,365 A | 10/1993 | Santiago |
| 5,279,041 A | 1/1994 | Wright |
| 5,406,714 A | 4/1995 | Baker et al. |
| 6,041,510 A | 3/2000 | Huff |
| 6,173,502 B1 | 1/2001 | Scarborough |
| 6,293,023 B1 | 9/2001 | Schooley |
| 6,637,120 B2 | 10/2003 | Pustay |
| 6,675,490 B1 | 1/2004 | Krehel et al. |
| 6,792,686 B2 | 9/2004 | Krehel et al. |
| 7,150,107 B2 | 12/2006 | Kim |
| 7,290,346 B2 | 11/2007 | Szumer et al. |
| 7,536,797 B2 | 5/2009 | Steffens et al. |
| 7,900,366 B2 | 3/2011 | Spaulding |
| 8,661,698 B2 | 3/2014 | Kallabis |
| 8,914,987 B2 | 12/2014 | Sanchez et al. |
| D836,471 S | 12/2018 | Wyatt et al. |
| 10,520,308 B2* | 12/2019 | Burge .................. G01C 9/26 |
| 10,591,297 B2* | 3/2020 | Mackey ............... G01C 9/26 |
| 10,697,769 B2* | 6/2020 | Burge .................. G01C 9/26 |
| 10,852,133 B2* | 12/2020 | Burge .................. G01C 9/26 |

(Continued)

FOREIGN PATENT DOCUMENTS

| | | |
|---|---|---|
| WO | WO2005103615 | 11/2005 |
| WO | WO201722855 | 12/2017 |

*Primary Examiner* — Yaritza Guadalupe-McCall (74) *Attorney, Agent, or Firm* — Reinhart Boerner Van Deuren s.c.

(57) ABSTRACT

A tool, such as a level, including one or more covers or sleeves is provided. The level body and sleeve each have a cooperating engagement structure that allows the sleeve to be removably coupled to the level body. A level kit including a level body and a plurality of removable sleeves is also provided.

20 Claims, 7 Drawing Sheets

(56) References Cited

U.S. PATENT DOCUMENTS

| | | |
|---|---|---|
| 2002/0116833 A1 | 8/2002 | Hollenbeck |
| 2006/0248738 A1 | 11/2006 | Tran et al. |
| 2011/0265340 A1 | 11/2011 | Kallabis |
| 2013/0192075 A1 | 8/2013 | Sanches |
| 2013/0326895 A1 | 12/2013 | Bureau |
| 2015/0300819 A1 | 10/2015 | Pelletier et al. |
| 2017/0370716 A1* | 12/2017 | Burge ................ G01C 9/26 |
| 2018/0094925 A1 | 4/2018 | Mackey |
| 2020/0049502 A1* | 2/2020 | Burge ................ G01C 9/26 |
| 2020/0191567 A1* | 6/2020 | Mackey .............. G01C 9/26 |
| 2020/0318960 A1* | 10/2020 | Burge ................ G01C 9/26 |

* cited by examiner

LEVEL WITH REMOVABLE AND/OR INTERCHANGEABLE SLEEVE

CROSS-REFERENCE TO RELATED PATENT APPLICATIONS

The present application is a continuation of U.S. application Ser. No. 15/725,034, filed on Oct. 4, 2017, which claims the benefit of and priority to U.S. Provisional Application No. 62/404,630, filed on Oct. 5, 2016, both of which are incorporated herein by reference in their entireties.

BACKGROUND OF THE INVENTION

The present invention relates generally to the field of tools. The present invention relates specifically to a tool, such as a level or a spirit level, including a removable and/or interchangeable outer protective cover or sleeve. Levels, such as spirit levels, are used to determine the levelness of a structure, surface or workpiece. In use, the level is placed on or in contact with a surface to be measured, and the user views the location of a bubble within a vial relative to markings that indicate the levelness of the structure, surface or workpiece.

SUMMARY OF THE INVENTION

One embodiment of the invention relates to a level including a removable or replaceable outer sleeve. In such embodiments, the level includes a level body having an outer surface, and a sleeve having an inner surface. The inner surface of the sleeve removably engages the outer surface of level body such that the sleeve is removable, interchangeable, etc. without tearing, breaking, or otherwise damaging the sleeve or the level body.

In specific embodiments, the level body is made from a metal material, and the sleeve is made from a polymer material. In specific embodiments, the outer surface of the level body includes first and second elongate, lateral surfaces, that extend longitudinally between first and second ends of the level body. The level includes at least one channel formed in each of the first and second lateral surfaces. In such embodiments, the sleeve includes a rail positioned to engage each channel. In such embodiments, the rail is shaped relative to the channel such that the movement of the sleeve outward in a direction perpendicular to the first and second lateral surfaces is resisted by engagement between the rail and the corresponding channel.

In specific embodiments, each of the channels extend the entire length of the first and second lateral surfaces, and the rails extend the entire longitudinal length of the sleeve. In specific embodiments, each rail is a projection extending inward from the inner surface of the sleeve. In specific embodiments, each channel is formed by a shaped portion of a wall of the level body, and in some such embodiments, the thickness of the wall of the level body at the location of each channel is substantially the same as the thickness of the wall of the level body outside of the channels.

Another embodiment of the invention relates to a level including a level body formed from a metal material. The level body includes an upper surface, a lower surface opposite the upper surface and a wall extending between the upper surface and the lower surface. The wall defines an outwardly facing, left side surface and an outwardly facing, left side surface. The level body includes a first channel defined in the wall and recessed relative to the left side surface and a second channel defined in the wall and recessed relative to the right side surface. The level includes a level vial supported by the level body. The level includes a protective outer cover including an outer surface, an inner surface, a body between the outer surface and the inner surface, a first rib extending inwardly away from the inner surface and a second rib extending inwardly away from the inner surface. The first rib is received by the first channel and the second rib is received into the second channel. Engagement between the first rib and first channel and between the second rib and the second channel couples the protective outer cover to the level body.

Another embodiment of the invention relates to a level kit. The level kit includes a level body formed from a metal material and defining a longitudinal axis and a level vial supported by the level body. The level kit includes a first protective outer sleeve removably coupled to the level body. The level kit includes a second protective outer sleeve configured to be removably coupled to the level body in place of the first protective outer sleeve.

Another embodiment of the invention relates to a method of using a level. The method includes providing a level. The level includes a level body, a level vial supported by the level body and a first protective sleeve removably coupled to the level body. The first protective sleeve surrounds at least a portion of an outer surface of the level body when viewed in cross-section perpendicular to a longitudinal axis of the level body. The method includes removing the first protective sleeve from the level body. The method includes coupling a second protective sleeve to the level body in place of the first protective sleeve such that the second protective sleeve surrounds at least a portion of an outer surface of the level body when viewed in cross-section perpendicular to a longitudinal axis of the level body.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Referring generally to the figures, various embodiments of a level, such as a spirit level, are shown. In general, levels have one or more precision surfaces used for engagement with a workpiece during leveling, and when a level is used in certain harsh environments, material (e.g., concrete, dirt, dust, etc.) may scratch, stick to or otherwise damage the precision surface(s). Accordingly, in various embodiments discussed herein, Applicant has developed a level with an innovative removable and/or interchangeable covering(s) which allow the user of the level to install a protective cover when the level is going to be used in a harsh environment to protect the level, and the precision surface(s) in particular, and to allow for the cover to be removed during other uses or storage.

In specific embodiments, the levels discussed herein include one or more grooves or channels formed in the outer surface of the level body, and the channel is shaped to receive a cooperating rail formed on the inner surface of the cover to hold the cover in place over the level body. In this manner, the cooperating rail and groove structure discussed herein allows the cover to be easily attached, removed and reattached from the level body. Specifically, the rail/groove configuration discussed herein allows for removal and reattachment of the sleeve without the need of adhesives, tools, etc. for attachment or cutting, tearing, solvents, etc. for removal of the sleeve.

In specific embodiments, level bodies discussed herein are formed from a hollow piece of material, such as a hollow piece of metal material (e.g., a hollow piece of extruded aluminum), and in such embodiments, the grooves or channels are formed during the extrusion of the level body. In other embodiments, the level bodies discussed herein utilize an open channel style construction such as an I-beam style level body, a U-shaped level body, a C-shaped level body, etc. In specific embodiments, the cover is formed from an extruded polymer material, and the rail(s) of the cover are formed during extrusion of the cover.

In specific embodiments, the removable cover is configured to generally provide a layer of protective material between the level body and the environment. In various specific embodiments, the removable cover is configured to provide additional protection in relation to particular environments or uses. For example, the level cover may include an outer surface that resists or limits the ability of material, such as concrete to stick to the level. In another embodiment, the cover includes a wide base structure adding stability to the level.

In addition, in some specific embodiments, the removable cover is further configured to provide additional functionality to the level. For example, in some embodiments the cover may have one or more surfaces shaped or otherwise configured as a tool (e.g., a forming tool, a workpiece engagement surface, an impact surface, etc.). In some other embodiments, the cover may include a surface configured as a hand grip and/or an anti-slip surface for engaging a surface (such as a wall) during use of the level.

Figure 1:
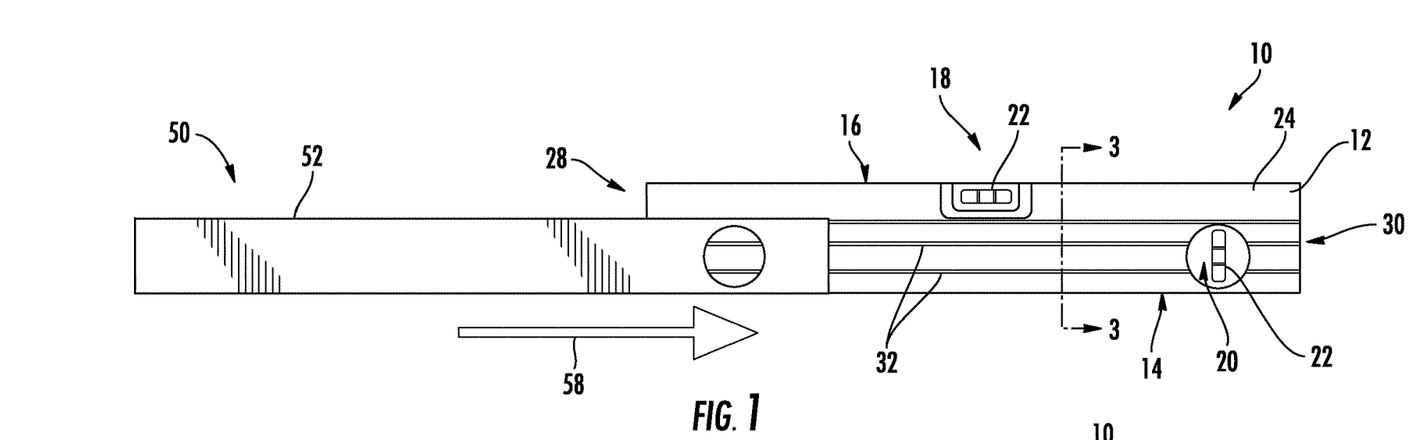
FIG. 1 is a side view of a level showing sleeve attachment, according to an exemplary embodiment.

Referring to FIG. 1, a leveling device, such as level 10, is shown according to an exemplary embodiment. In general, level 10 includes a body 12 that includes a base surface 14 and an opposing top surface 16. Base surface 14 is a flat, planar surface that engages a surface of a workpiece to be measured using level 10. In some specific embodiments, base surface 14 is machined to have a flat, flush or planar surface following formation of body 12 (e.g., following extrusion of a metal forming body 12), and in some embodiments, this machined surfaced may be anodized.

Figure 2:
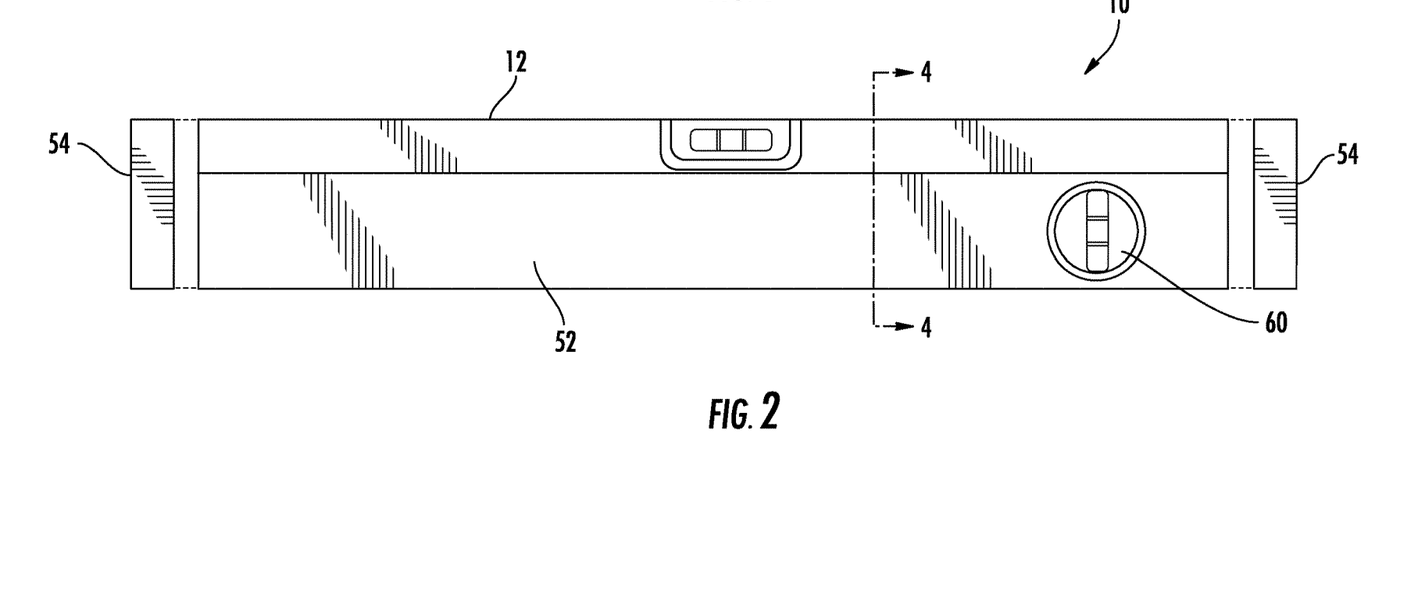
FIG. 2 is a side view of the level of FIG. 1 following sleeve attachment, according to an exemplary embodiment.

Referring to FIG. 1 and FIG. 2, level 10 includes a plurality of bores formed in body 12. As shown in FIG. 1, level 10 includes a central opening 18 and at least one end opening 20. As will be understood, openings 18 and 20 each receive a level vial 22 (e.g., bubble vials) which are held in the appropriate orientation relative to base surface 14 in order for the vials to indicate the angle, levelness, degree of plumb, etc. of the corresponding surface of a workpiece, as needed for a particular level design or level type.

Figure 3:
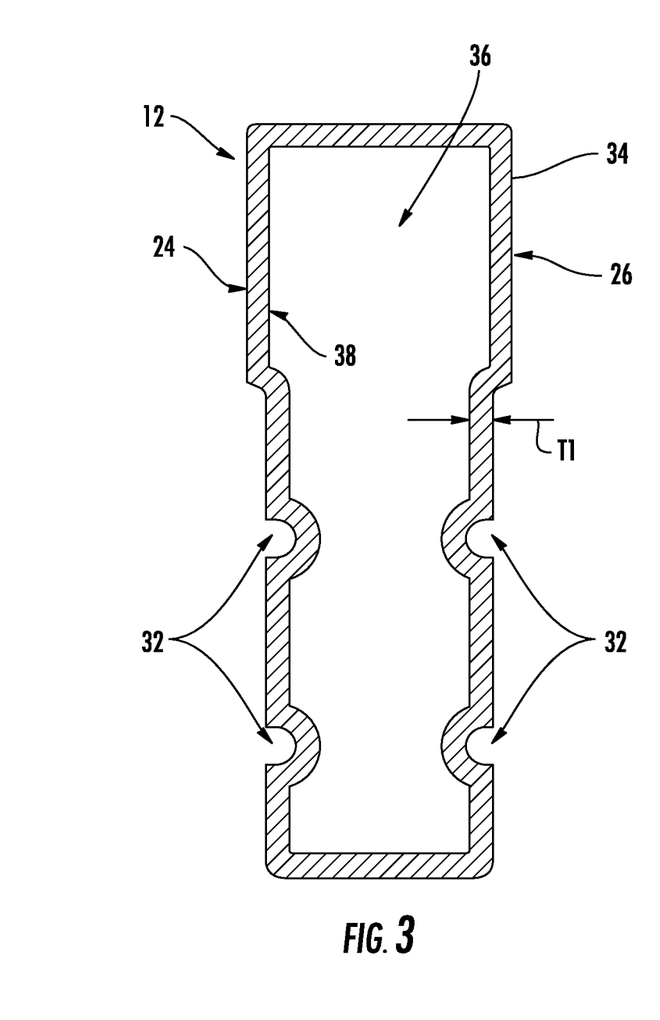
FIG. 3 is a cross-section view of the level of FIG. 1 taken along line 3-3, according to an exemplary embodiment.

Referring to FIGS. 1-3, level body 12 includes a pair of opposing side surfaces, shown as left side surface 24 and right side surface 26. In general, side surfaces 24 and 26 are the long, generally vertical surfaces that extend in the longitudinal direction between first and second ends 28 and 30 of level body 12. In addition, side surfaces 24 and 26 extend in the vertical direction between base surface 14 and top surface 16.

As shown best in FIGS. 1 and 3, side surfaces 24 and 26 each include one or more channels or grooves 32 that extend longitudinally along the surface. As shown, grooves 32 are recessed relative to the surrounding, adjacent portions of side surfaces 24 and 26. In various embodiments, grooves 32 are not through-bores such that grooves 32 do not extend all of the way through level body 12. In specific embodiments, each of grooves 32 extend parallel to the plane defined by at least one of base surface 14 and/or upper surface 16. In specific embodiments, each of grooves 32 extend the entire length of side surfaces 24 and 26 between ends 28 and 30 such that grooves 32 open at ends 28 and 30.

In some embodiments, level body 12 is generally formed from a wall 34 defining a hollow central area 36. In specific embodiments, body 12 of level 10 is an extruded, contiguous and continuous metal structure, such as an extruded aluminum structure, that defines hollow central area 36, and in such embodiments, central area 36 extends the entire longitudinal length of level body 12 between ends 28 and 30. In some such embodiments, grooves 32 are formed as concave shaped sections of wall 34, and in such embodiments, the thickness, T1, of wall 34 is the same at the location of grooves 32 as outside of grooves 32. In this arrangement, as shown in FIG. 3, wall 34 has convex protrusions along the inner surface 38 at the location of grooves 32. In such embodiments, by maintaining a consistent wall thickness around its perimeter, level body wall 34 maintains a high level of strength at the location of grooves 32. In other embodiments, level body 12 may be formed from a single continuous wall or structure that defines one or more outward facing, open channels, such as an I-beam style level body, a U-shaped level body, a C-shaped level body, etc.

However, in other embodiments, grooves 32 may be formed as depressions formed along the outer surface of wall 34 only. In such embodiments, the thickness of wall 34 at the location of grooves 32 may be less than in areas outside of grooves 32. In addition, in such embodiments, the inner surface of wall 34 at the location of grooves 32 may be coplanar with portions of the inner surface of wall 34 that are located outside of and adjacent to grooves 32.

Figure 4:
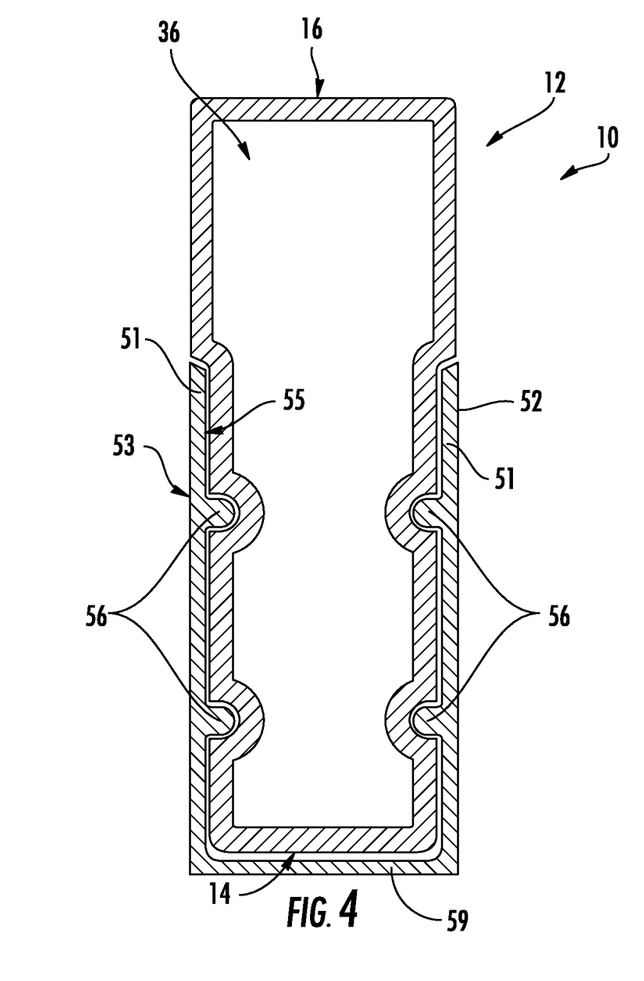
FIG. 4 is a cross-section view of the level of FIG. 1 taken along line 4-4, according to an exemplary embodiment.
Figure 5:
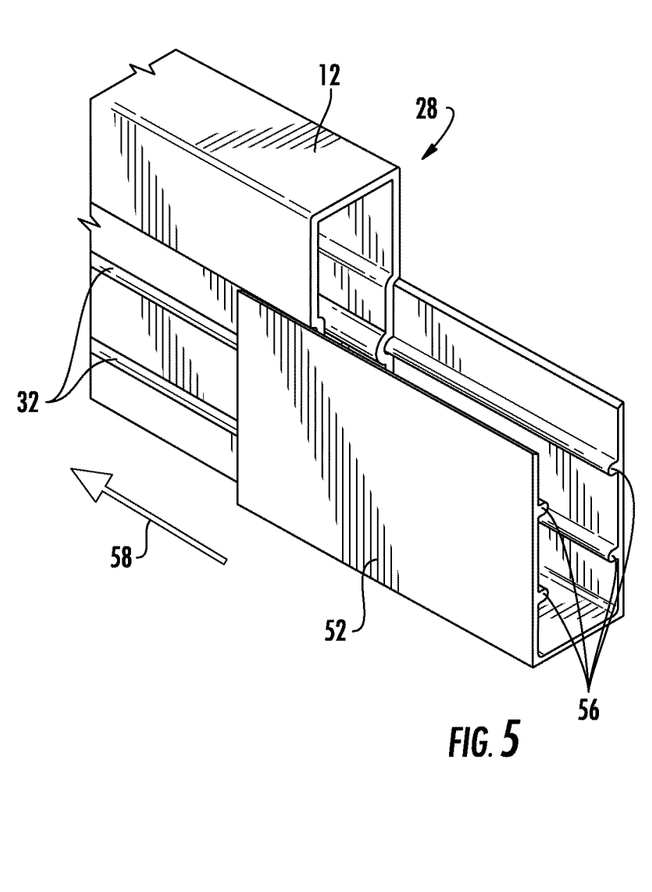
FIGS. 5 and 6 are perspective views of an end of the level of FIG. 1 showing sleeve alignment and attachment, according to an exemplary embodiment.
Figure 6:
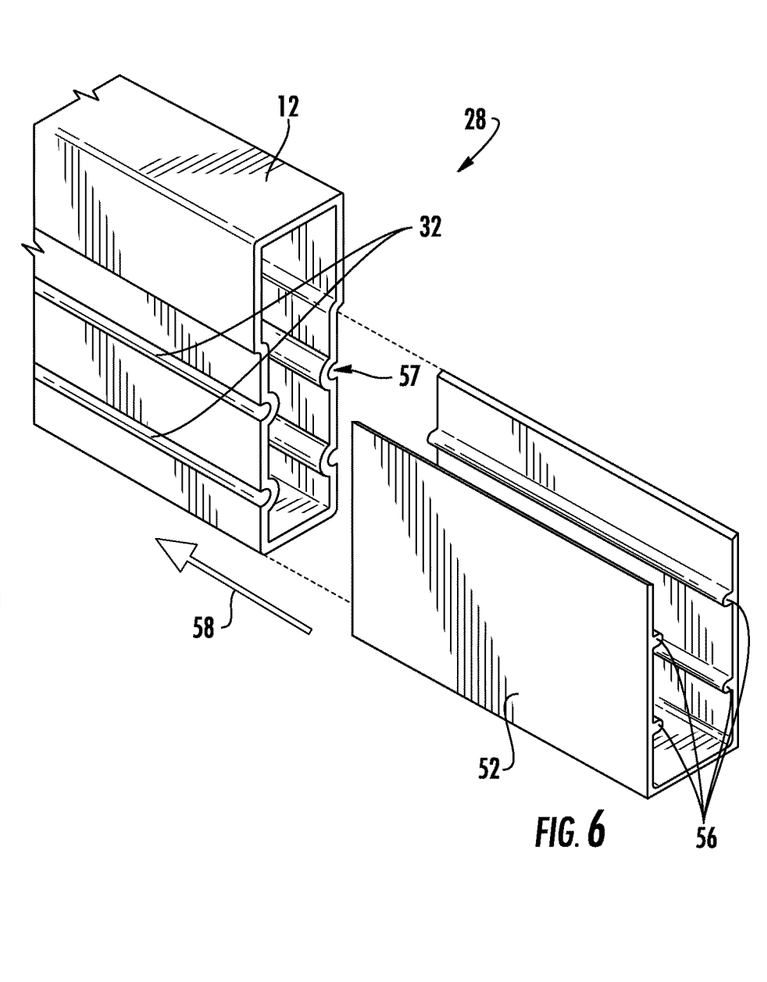

Referring generally to FIGS. 1, 2 and 4, level 10 includes a removable and/or interchangeable cover, shown as sleeve 50. Sleeve 50 includes a body 52 and a pair of end caps 54. In general, end caps 54 are structures that seal the ends of level body 12, such that material (e.g., dirt, dust, cement, etc.) is blocked from entering into level body 12. As shown in FIG. 4, sleeve body 52 includes ribs, shown as a plurality of rails 56, that extend inward from the inner surface 55 of sleeve body 52. As shown, rails 56 are shaped to be received within grooves 32 such that the engagement between rails 56 and grooves 32 couples sleeve body 52 to level body 12. In such embodiments, level body 12 is a contiguous uninterrupted structure in at least some cross-sectional positions as shown in FIG. 4, and in such embodiments, rails 56 do not extend through level body 12 and into central cavity 36.

As shown, rails 56 are shaped relative to grooves 32 such that movement in a direction outward from level body 12 (e.g., perpendicular to sides 24 and 26 in the orientation of FIG. 4) is prevented or resisted. In a specific embodiment, rails 56 are shaped to include at least one dimension, e.g., the height dimension in the orientation of FIG. 4 that is greater than a cooperating dimension of groove 32. These relative dimensions provide the engagement between rails 56 and grooves 32 that provides the frictional engagement that lock sleeve body 52 in place relative to sides 24 and 26 of level body 12.

In the embodiment shown in FIG. 4, sleeve body 52 defines an outer surface 53 opposite from inner surface 55. A pair of vertical side walls 51 extend away from an end wall 59. Sleeve body 52 is generally U-shaped and has a height of sidewalls 51 that is less than height of level body 12. In this arrangement, end wall 59 of sleeve body 52 is located adjacent to and below base surface 14, such that sleeve body 52 protects and covers a lower or base surface 14 (which is one of the precision surfaces of level 10) while leaving upper surface 16 exposed for use (e.g., as a grip, as a scribing/scraping tool, etc.). In addition, sleeve body 52 protects a portion of side surfaces 24 and 26 more than half of the way upward away from base surface 14 toward upper surface 16.

As shown in FIGS. 1, 2, 5, and 6, to attach sleeve 50 to level body 12, rails 56 are aligned with grooves 32, and sleeve body 52 is moved in the direction of arrow 58 generally parallel to the longitudinal axis of level body 12. In this arrangement, rails 56 are slidably engaged within grooves 32. As sleeve body 52 is moved in the direction of arrow 58, rails 56 slide within grooves 32 until sleeve body 52 covers at least a portion of base surface 14 and a portion of the longitudinal length of side surfaces 24 and 26. In specific embodiments, a maximum longitudinal length of sleeve body 52 is at least 90% of a maximum longitudinal length of level body 12. In such embodiments, sleeve body 52 covers at least 90% of the length of base surface 14 and of the side surfaces of level body 12.

In some embodiments, sleeve body 52 has a length that is the same as level body 12. In such embodiments, as sleeve body 52 is moved in the direction of arrow 58, rails 56 slide within grooves 32 until sleeve body 52 covers the entire base surface 14 and extends the entire longitudinal length of side surfaces 24 and 26. With sleeve body 52 in place, end caps 54 are coupled to ends 28 and 30 of level body 12, for example via friction fit. To remove sleeve 50 from level body 12, this process is reversed.

In general, the groove/rail arrangement of level body 12 and sleeve 50 discussed herein allows for sleeve 50 to be removed, interchanged or replaced as needed by the user. In specific embodiments, grooves 32 extend all of the way to at least one end 28 or 30 of level body 12 which allows for insertion and removal of rails 56 from grooves 32 at openings 57. In such embodiments, the longitudinal length of grooves 32 is the same as the maximum longitudinal length of side surfaces 24 and 26 and/or as the longitudinal length of base surface 14 and/or upper surface 16. In some such embodiments, sleeve 50 is a structure coupled to level body 12 by friction alone, specifically friction between rails 56 and grooves 32, and in such embodiments, sleeve 50 is not adhered to level body 12 with an adhesive material, melt bonding, etc. In addition, in some such removable embodiments, no portion of sleeve body 52 extends through level body wall 34 into central cavity 36.

In various embodiments, sleeve 50 is formed from a material that is different from the material of level body 12. In some embodiments, level body 12 is formed from a metal material, and sleeve body 52 and/or end caps 54 are formed from a polymer material. In specific embodiments, level body 12 is formed from an extruded aluminum material, and sleeve body 52 is formed from an extruded material. In various embodiments, sleeve body 52 can be made of a wide variety of extruded materials including aluminum, magnesium, nylon, acrylonitrile-butadiene-styrene (ABS), polyethylene, polypropylene, polyvinylchloride, silicone, etc.

Referring to FIG. 2, in some embodiments, sleeve 50 may also be configured to provide extra protection to one or more of the level vials supported by level body 12. In such embodiments, sleeve 50 includes one or more windows 60 supported by sleeve body 52 at a position such that window 60 aligns with one of the level vials 22 when sleeve 50 is installed onto level body 12. In this arrangement, level vial(s) 22 are visible through window(s) 60 when sleeve body 52 is coupled to level body 12. In specific embodiments, window(s) 60 are formed from a hard, scratch resistant, transparent/translucent material to both protect level vials 22 within level body 12 and allow the user to easily view the level vial through the window. In various embodiments, window(s) 60 are formed from one or more durable, scratch resistant materials which resist scratching during use in a construction environment. In various embodiments, window(s) 60 are formed from a hard plastic material, such as high density polyethylene, or a hard, strengthened glass material, such as tempered soda lime glass, sapphire lens, a chemically strengthened glass material, such as an alkali-aluminosilicate glass material, such as Gorilla Glass, etc.

Figure 7:
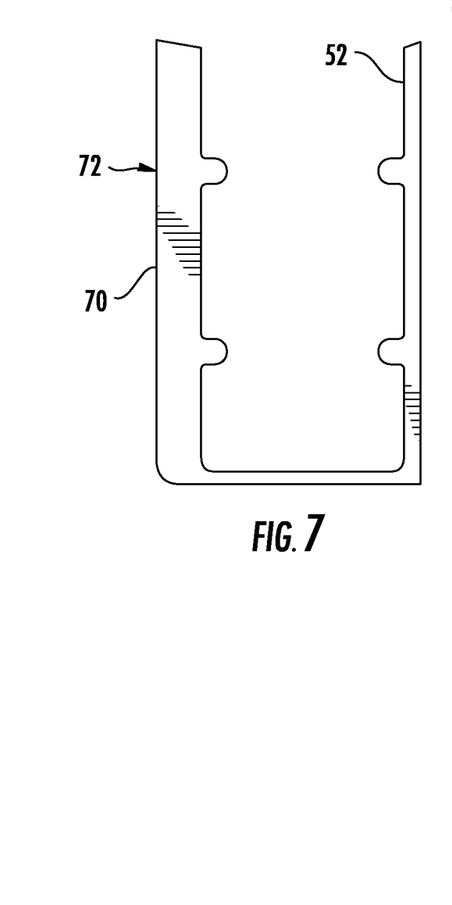
FIGS. 7-11 are cross-sectional views of different level sleeves, according to exemplary embodiments.

Referring to FIGS. 7-14, various embodiments of sleeve 50 including one or more features, structures, shapes, materials, etc. that provide additional functionality to level 10 are shown. Referring to FIG. 7, sleeve 50 may include a gripping wall 70. In general, gripping wall 70 is one of the sidewalls of sleeve 50 which supports rails 56 and is configured with an anti-slip or high friction outer surface 72. In use, outer surface 72 may be placed adjacent to a surface such as a wall, and the friction between outer surface 72 and the wall resists movement of level 10 during use.

In specific embodiments, gripping wall 70 is formed from a polymer material that is different from the material of sleeve body 52. In some such embodiments, gripping wall 70 is formed from a co-molded or over-molded layer of polymer material that has a higher coefficient of friction and/or lower durometer than that of the material of sleeve body 52. In various embodiments, gripping wall 70 may be made from a material such as a thermoplastic elastomer (TPE), a thermoplastic urethane (TPU), a soft touch material, a silicone material, etc.

Figure 8:
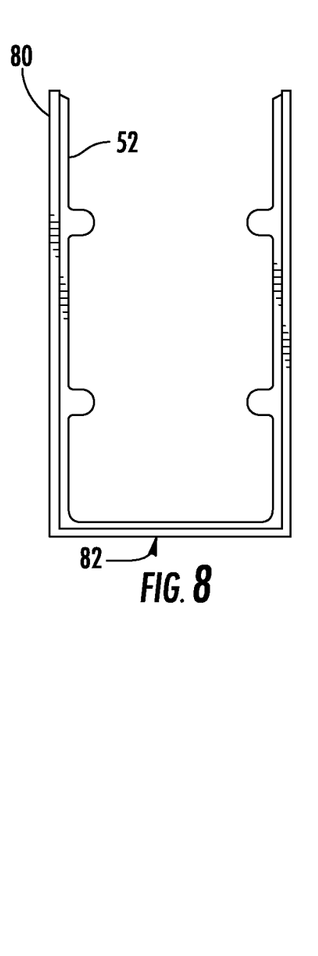

Referring to FIG. 8, sleeve 50 may include an outer layer 80 located around and outside of sleeve body 52. In this embodiment, outer layer 80 is formed from a polymer material with anti-stick properties on outer surface 82 that limits the ability of dirt, dust, concrete and/or other construction materials to adhere to the outer surface of sleeve 50. In various embodiments, the material of outer layer 80 has one or more properties, such as low friction, low porosity, low surface roughness, high hydrophobicity, etc., which may limit the ability of material to adhere to the outer surface of outer layer 80. In a specific embodiment, outer layer 80 is made from a silicone material, and in specific embodiments, outer layer 80 is co-molded or over-molded around sleeve body 52.

Figure 9:
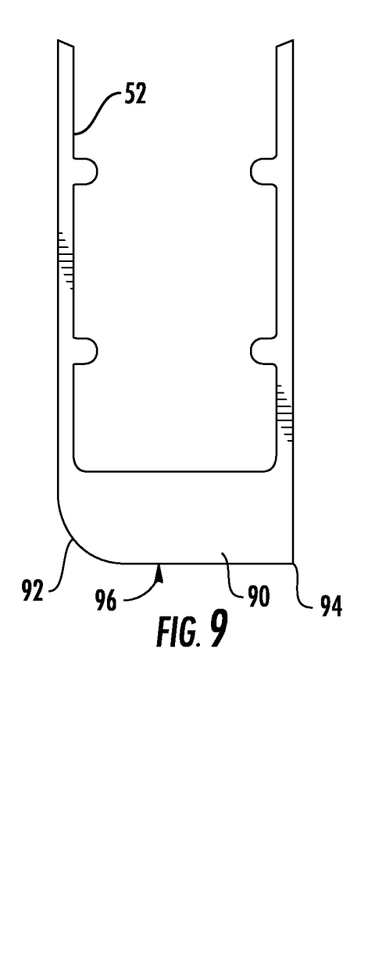

Referring to FIG. 9, sleeve 50 may include a shaped or profiled end section 90. As shown, end section 90 is shaped to have at least one rounded corner, shown as rounded corner 92, a right angle corner 94 and a flat surface 96. In this embodiment, rounded corner 92 provides an easily gripped surface, while sharper corner 94 and flat surface 96 provide scribing and/or scraping edges/surfaces to sleeve 50. In particular embodiments, the shape of end section 90 provides sharp edges that may be used to spread concrete which also prevents direct contact between base surface 14 of level body 12 and the concrete.

Figure 10:
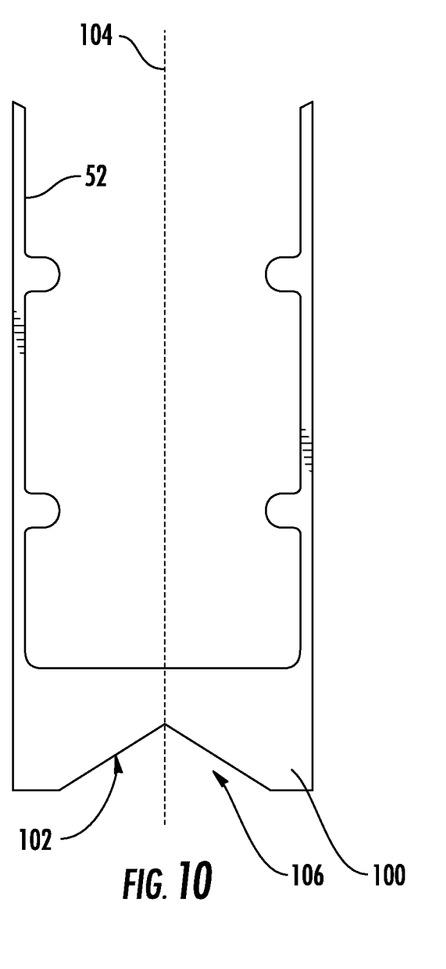

Referring to FIG. 10, sleeve 50 may include a groove-shaped end section 100. As shown, end section 100 includes an outer surface 102 that tapers inward toward the medial plane 104 of sleeve 50 defining channel 106. In such embodiments, channel 106 facilitates engagement with elongate workpieces, such as pipe or conduit.

Figure 11:
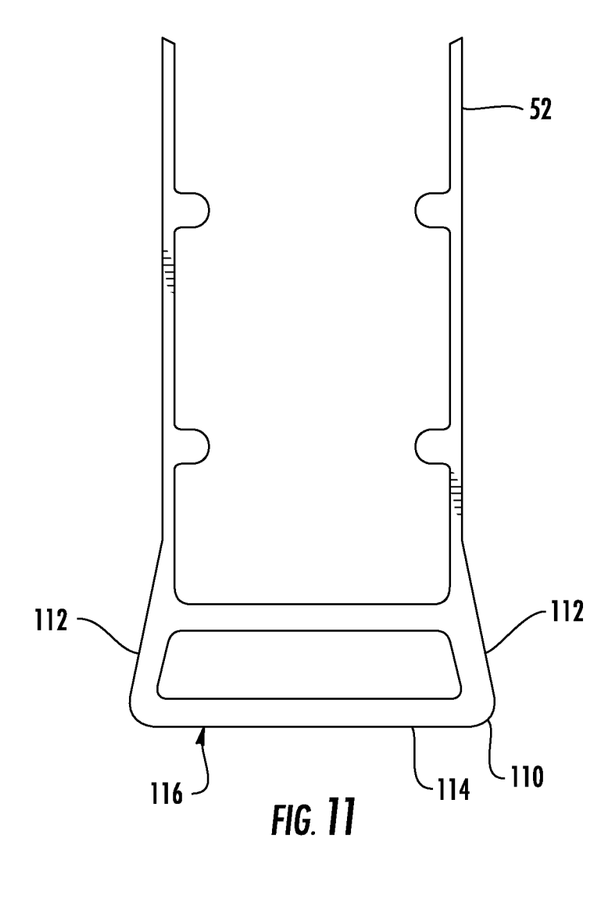

Referring to FIG. 11, sleeve 50 may include a base section 110 that is enlarged to improve stability of level 10. In this embodiment, base section 110 includes a pair of sidewalls 112 that extend laterally outward and downward away from sleeve body 52. In addition, base section 110 includes a base wall 114 that extends between the sidewalls 112 defining a base surface 116. As shown in FIG. 11, base surface 116 has a width that is greater (e.g., at least 10% greater, at least 30% greater, at least 50% greater) than the width of sleeve body 52 at positions above base section 110.

Figure 12:
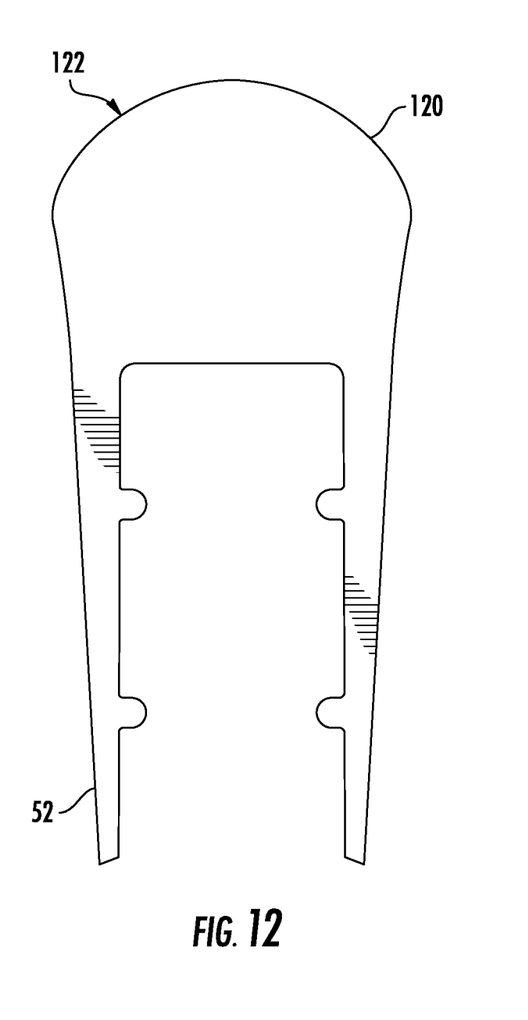
FIGS. 12 and 13 are cross-sectional views of different level sleeves, according to exemplary embodiments.

Referring to FIG. 12, sleeve 50 may include a rounded end section 120. As shown, end section 120 includes a rounded outer surface 122 and also provides an area of increased size that facilitates gripping of sleeve 50. As shown, end section 120 provides both additional width and additional height to sleeve body 52 at the location of end section 120. In a specific embodiment, rounded end section 120 provides a grip that allows level 10 to be used as a tool, such as a screeding tool. In such embodiments, a user grips end section 120 and uses the upper surface 16 and/or adjacent corners for screeding, scribing, scraping, etc.

Figure 13:
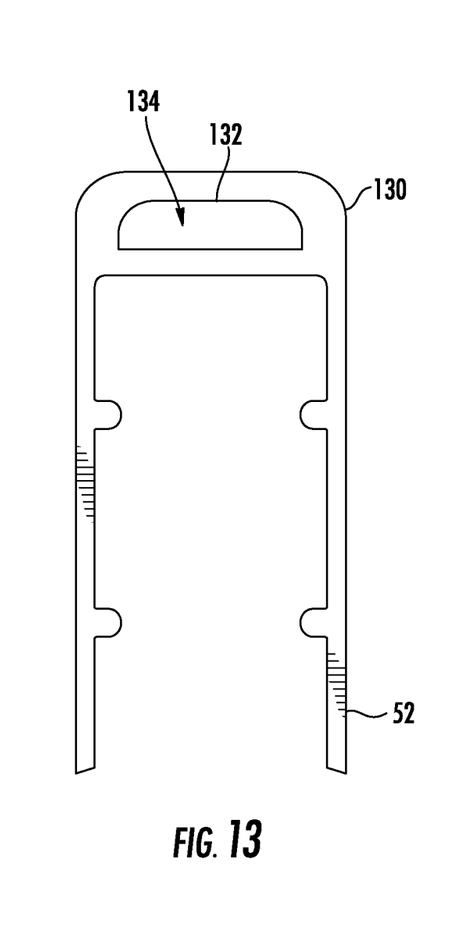

Referring to FIG. 13, sleeve 50 may include an impact resistant end 130. As shown, impact resistant end includes a wall 132 defining a hollow space 134. Wall 132 and hollow space 134 provide an impact resistant zone that protects base surface 14 during impact events. In a specific embodiment, level 10 may be used as an impact tool. In such uses, upper surface 16 of level 10 may be in contact with a workpiece, and the user may strike impact resistant end 130 (e.g., with a hand, a trowel, etc.) to deliver a force to the workpiece. In such uses, impact resistant end 130 protects base surface 14 of level body 12 from damage from such impacts.

Figure 14:
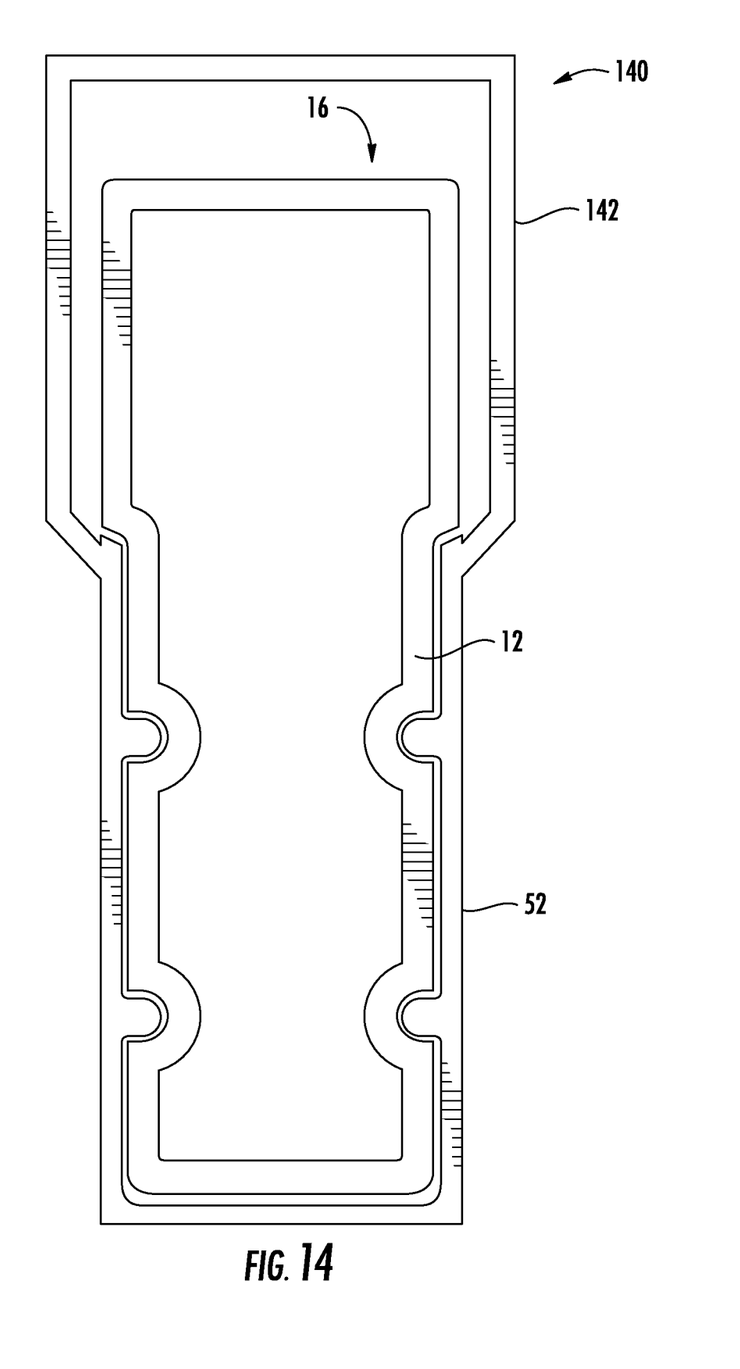
FIG. 14 is a cross-sectional view of a level sleeve, according to another exemplary embodiment.

Referring to FIG. 14, sleeve 50 may include an enclosed upper end 140. In this embodiment, sleeve 50 includes a wall 142 that extends upward from sleeve body 52 and around upper surface 16 of level body 12. In this embodiment, sleeve 50 surrounds the entire level body 12 protecting base surface 14, upper surface 16 and all of side surfaces 24 and 26. In some embodiments, enclosed upper end 140 is expanded relative to level body 12 providing an enlarged grip area by which level 10 can be carried.

In various embodiments, a modular level kit is provided. In such embodiments, the kit includes level 10 and one or more of the various types of sleeves 50 as discussed herein. In use, because of the groove/rail design discussed above, a user may easily remove one sleeve and replace it with another sleeve using the assembly/removal process discussed above. Thus, in such embodiments, level 10 allows a modular kit to be provided which allows a user to select one or more of the sleeve embodiments discussed herein as needed for protection of level 10, for different uses of level 10, ease of handling, etc. In such embodiments, by providing an easily replaceable outer sleeve 50, the relatively high cost, durable and precision-machined metal level body 12 can be protected, and when sleeve 50 is worn out, sleeve 50 can be replaced without requiring replacement of the entire level.

In a specific embodiment, the level kit includes a level body 12, first protective sleeve 50, and a second protective sleeve which may be any of the sleeves discussed herein. In such embodiments, the first protective sleeve may be coupled to the level body 12, and the second protective sleeve is configured to be coupled to level body 12, through a structure such as ribs 56. This kit allows the user to replace the first protective sleeve with the second protective sleeve as may be needed. In a specific embodiment, the first protective outer sleeve, e.g., sleeve 50, defines a first profile shape when viewed in cross-section at a first position in the longitudinal direction, and the second protective outer sleeve defines a second profile shape when viewed in cross-section at the first position in the longitudinal direction. In such embodiments, the first profile shape is different than the second profile shape. Thus, in these embodiments, the level kit may include two or more sleeves with any combination of the different shapes shown in FIGS. 4 and 7-14.

In various embodiments, methods of using a level, such as level 10, are provided. In various embodiments, the method includes providing a level, such as level 10. The level includes a level body, a level vial supported by the level body and a first protective sleeve, such as sleeve 50, removably coupled to the level body. The first protective sleeve surrounds at least a portion of an outer surface of the level body when viewed in cross-section perpendicular to a longitudinal axis of the level body. The method includes removing the first protective sleeve from the level body and coupling a second protective sleeve to the level body in place of the first protective sleeve such that the second protective sleeve surrounds at least a portion of an outer surface of the level body when viewed in cross-section perpendicular to a longitudinal axis of the level body.

In specific embodiments, the removing step includes sliding the first protective sleeve relative to the level body in a first longitudinal direction such that a rib, such as rib 56, of first protective sleeve disengages from a channel, such as channel 32, defined in the level body. In some embodiments, the coupling step comprises aligning a rib of the second protective sleeve with the channel and sliding the second protective sleeve relative to the level body in a second longitudinal direction opposite the first longitudinal direction such that the rib of the second protective sleeve is received into the channel.

As discussed above, in some embodiments, the second protective sleeve, such as sleeve 50, comprises a transparent window, such as window 60. In such embodiments, the method of using the level includes aligning the transparent window of the second protective sleeve with the level vial such that the level vial is viewable through the transparent window. This alignment between window 60 and level vial 22 is shown in FIG. 2, according to an exemplary embodiment. In various embodiments of the method of using a level, during the coupling of the second protective sleeve to the level body, a portion of a side surface of the level body and a planar base surface of the level body are covered by the second protective sleeve.

In some embodiments, the method includes the step of coupling a first end cap, such as end cap 54, to a first end, such as end 28, of the level body after the coupling of the second protective sleeve to the level body. In some embodiments, the method includes coupling a second end cap to a second end of the level body after the coupling of the second protective sleeve to the level body. Coupling of end caps 54 to both ends of level body 12 are shown in FIG. 2, according to an exemplary embodiment.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more components or elements, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A level comprising:
   a level body comprising:
      an upper surface;
      a lower surface opposite the upper surface;
      a wall extending between the upper surface and the lower surface, the wall defining an outwardly facing, left side surface and an outwardly facing, right side surface;
      a first channel defined in the wall and recessed relative to the left side surface;
      a second channel defined in the wall and recessed relative to the right side surface; and
   a level vial supported by the level body; and
   a protective outer cover comprising:
      an outer surface;
      an inner surface;
      a body between the outer surface and the inner surface;
      a first rib extending inwardly away from the inner surface; and
      a second rib extending inwardly away from the inner surface;
   wherein the first rib is received by the first channel and the second rib is received into the second channel, wherein engagement between the first rib and first channel and the second rib and the second channel couples the protective outer cover to the level body;
   wherein the body of the protective outer cover includes a pair of vertical sidewalls extending away from an end wall, wherein the first rib and the second rib extend inward from portions of the inner surface defined by the vertical sidewalls, wherein heights of the vertical sidewalls are less than a height of the wall of the level body such that portions of the left and right side surfaces of the level body and the upper surface of the level body are not covered by the protective outer cover.

2. The level of claim 1, wherein the level body is formed from a metal material and the protective outer cover is formed from a polymer material.

3. The level of claim 2, wherein the level body is formed from a single integral piece of metal material, wherein the body of the protective outer cover is formed from a single, integral piece of polymer material, wherein the protective outer cover has a maximum length measured in a longitudinal direction that is at least 90% of a maximum length of the level body measured in the longitudinal direction.

4. The level of claim 1 wherein the end wall of the protective outer cover is located adjacent to and below the lower surface of the level body such that the end wall of the protective outer cover covers the lower surface of the level body.

5. The level of claim 1, wherein the first channel and the second channel each define an opening located at a first end of the level body, wherein the first channel and the second channel both extend longitudinally relative to the left and right side surfaces from the first end of the level body toward a second end of the level body, wherein the ribs of the protective outer cover slidably engage the first and second channels of the level body.

6. The level of claim 5, wherein a height dimension of the first channel is less than a height dimension of the first rib of the protective outer cover such that engagement between the first channel and the first rib limits movement of the protective outer cover away from the level body in a direction perpendicular to the left side surface, wherein a height dimension of the second channel is less than a height dimension of the second rib of the protective outer cover such that engagement between the second channel and the second rib limits movement of the protective outer cover away from the level body in a direction perpendicular to the right side surface.

7. The level body of claim 1, wherein the protective outer cover includes a window formed from a transparent material supported by the body of the protective outer cover, wherein the window is positioned adjacent the level vial such that the level vial is viewable through the window.

8. A level comprising:
a level body comprising:
an upper surface;
a lower surface opposite the upper surface;
a wall extending between the upper surface and the lower surface, the wall defining an outwardly facing, left side surface and an outwardly facing, right side surface;
a first channel defined in the wall and recessed relative to the left side surface;
a second channel defined in the wall and recessed relative to the right side surface; and
a protective outer cover comprising:
an outer surface;
an inner surface;
a body between the outer surface and the inner surface;
a first rib extending inwardly away from the inner surface; and
a second rib extending inwardly away from the inner surface;
wherein the first rib is received by the first channel and the second rib is received into the second channel, wherein engagement between the first rib and first channel and the second rib and the second channel couples the protective outer cover to the level body;
wherein the first channel and the second channel each define an opening located at a first end of the level body, wherein the first channel and the second channel both extend longitudinally relative to the left and right side surfaces from the first end of the level body toward a second end of the level body, wherein the ribs of the protective outer cover slidably engage the first and second channels of the level body;
wherein a height dimension of the first channel is less than a height dimension of the first rib of the protective outer cover such that engagement between the first channel and the first rib limits movement of the protective outer cover away from the level body in a direction perpendicular to the left side surface, wherein a height dimension of the second channel is less than a height dimension of the second rib of the protective outer cover such that engagement between the second channel and the second rib limits movement of the protective outer cover away from the level body in a direction perpendicular to the right side surface.

9. The level of claim 8, wherein the level body is formed from a metal material, and the protective outer cover is formed from a polymer material.

10. The level of claim 9, wherein the level body is formed from a single integral piece of metal material, wherein the body of the protective outer cover is formed from a single, integral piece of polymer material, wherein the protective outer cover has a maximum length measured in a longitudinal direction that is at least 90% of a maximum length of the level body measured in the longitudinal direction.

11. The level of claim 8, wherein the body of the protective outer cover includes a pair of vertical sidewalls extending away from an end wall, wherein the first rib and the second rib extend inward from portions of the inner surface defined by the vertical sidewalls, wherein heights of the vertical sidewalls are less than a height of the wall of the level body such that portions of the left and right side surfaces of the level body and the upper surface of the level body are not covered by the protective outer cover.

12. The level of claim 11, wherein the end wall of the protective outer cover is located adjacent to and below the lower surface of the level body such that the end wall of the protective outer cover covers the lower surface of the level body, wherein the wall of the level body includes an inner surface that defines an open central cavity that extends an entire length of the level body between opposing first and second ends of the level body.

13. The level body of claim 8, wherein the protective outer cover includes a window formed from a transparent material supported by the body of the protective outer cover, wherein the window is positioned adjacent the level vial such that the level vial is viewable through the window.

14. A level comprising:
a level body comprising:
an upper surface;
a lower surface opposite the upper surface;
a wall extending between the upper surface and the lower surface, the wall defining an outwardly facing, left side surface and an outwardly facing, right side surface;
a first channel defined in the wall and recessed relative to the left side surface;
a second channel defined in the wall and recessed relative to the right side surface; and
a level vial supported by the level body; and
a protective outer cover comprising:
an outer surface;
an inner surface;
a body between the outer surface and the inner surface;
a first rib extending inwardly away from the inner surface; and
a second rib extending inwardly away from the inner surface;
wherein the first rib is received by the first channel and the second rib is received into the second channel, wherein engagement between the first rib and first channel and the second rib and the second channel couples the protective outer cover to the level body;
wherein the protective outer cover includes a window formed from a transparent material supported by the body of the protective outer cover, wherein the window is positioned adjacent the level vial such that the level vial is viewable through the window.

15. The level of claim 14, wherein the level body is formed from a metal material and the protective outer cover is formed from a polymer material.

16. The level of claim 15, wherein the level body is formed from a single integral piece of metal material, wherein the body of the protective outer cover is formed from a single, integral piece of polymer material, wherein the protective outer cover has a maximum length measured in a longitudinal direction that is at least 90% of a maximum length of the level body measured in the longitudinal direction.

17. The level of claim 14, wherein the body of the protective outer cover includes a pair of vertical sidewalls extending away from an end wall, wherein the first rib and the second rib extend inward from portions of the inner surface defined by the vertical sidewalls, wherein heights of the vertical sidewalls are less than a height of the wall of the level body such that portions of the left and right side surfaces of the level body and the upper surface of the level body are not covered by the protective outer cover.

18. The level of claim 17, wherein the end wall of the protective outer cover is located adjacent to and below the lower surface of the level body such that the end wall of the protective outer cover covers the lower surface of the level body, wherein the wall of the level body includes an inner surface that defines an open central cavity that extends an entire length of the level body between opposing first and second ends of the level body.

19. The level of claim 14, wherein the first channel and the second channel each define an opening located at a first end of the level body, wherein the first channel and the second channel both extend longitudinally relative to the left and right side surfaces from the first end of the level body toward a second end of the level body, wherein the ribs of the protective outer cover slidably engage the first and second channels of the level body.

20. The level of claim 19, wherein a height dimension of the first channel is less than a height dimension of the first rib of the protective outer cover such that engagement between the first channel and the first rib limits movement of the protective outer cover away from the level body in a direction perpendicular to the left side surface, wherein a height dimension of the second channel is less than a height dimension of the second rib of the protective outer cover such that engagement between the second channel and the second rib limits movement of the protective outer cover away from the level body in a direction perpendicular to the right side surface.

* * * * *